No. 670,247. Patented Mar. 19, 1901.
A. H. RAUCH.
ICE MAKING APPARATUS.
(Application filed Jan. 18, 1901.)
(No Model.)
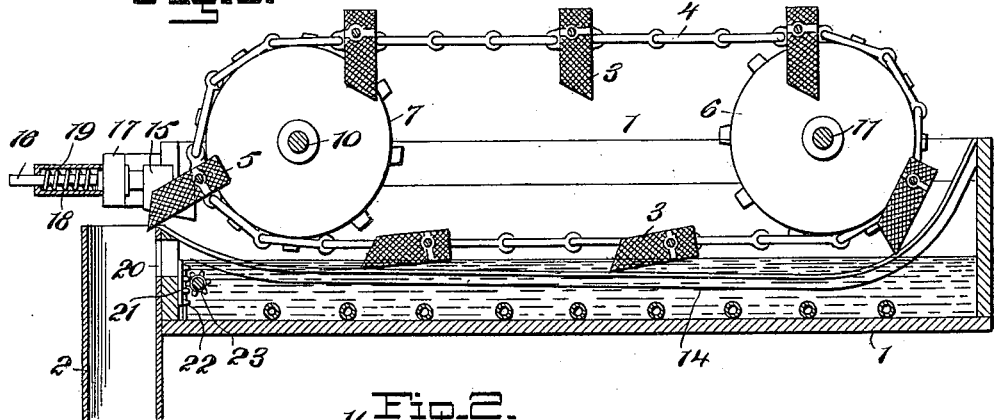
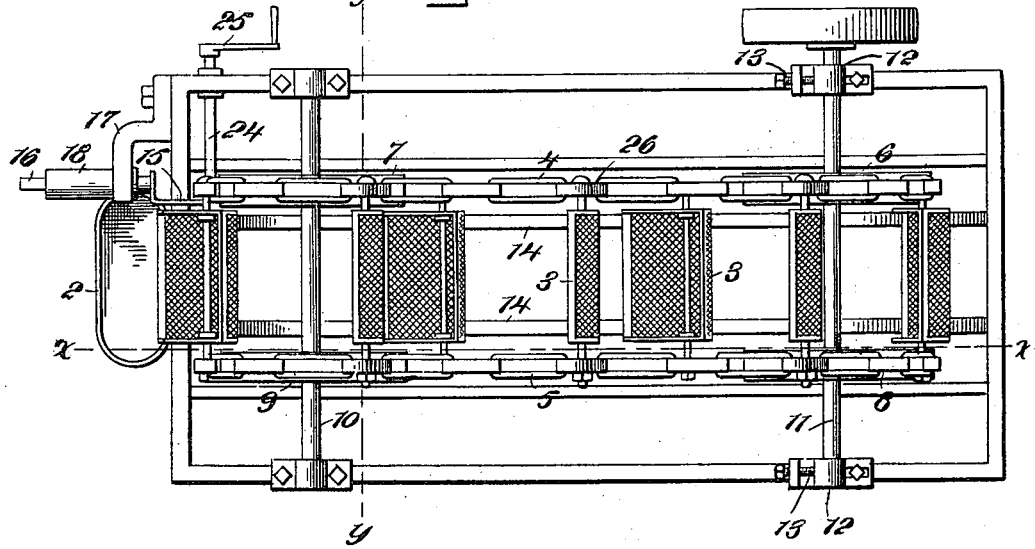
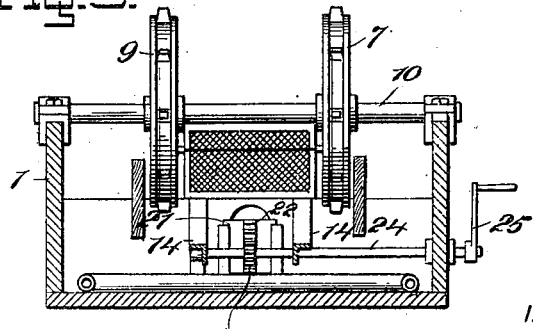
WITNESSES:
James F. Duhamel.
C. R. Ferguson
INVENTOR
Ambrose H. Rauch
BY
ATTORNEYS

UNITED STATES PATENT OFFICE.

AMBROSE HENRY RAUCH, OF BETHLEHEM, PENNSYLVANIA.

ICE-MAKING APPARATUS.

SPECIFICATION forming part of Letters Patent No. 670,247, dated March 19, 1901.

Application filed January 18, 1901. Serial No. 43,722. (No model.)

*To all whom it may concern:*

Be it known that I, AMBROSE HENRY RAUCH, a citizen of the United States, and a resident of Bethlehem, in the county of Northampton and State of Pennsylvania, have invented a new and Improved Ice-Making Apparatus, of which the following is a full, clear, and exact description.

This invention relates to improvements in ice-making apparatus.

In certain classes of ice-machines the ice particles or chips are turned off from the freezing-cylinder by a spiral conveyer and are assumed to be cool enough to freeze together when collected and compressed. By such method, however, the ice particles are constantly agitated before being discharged into the suction-pipe or solidifying device and the temperature becomes so reduced that certain veins or thin films of water in a completed cake sink down, drawing in air, giving the cake an inferior appearance.

It is the object of my invention to provide an improved means for collecting and discharging the ice particles without material agitation, so that the final cake will be more thoroughly frozen and solidified.

I will describe an ice-machine embodying my invention and then point out the novel features in the appended claims.

Reference is to be had to the accompanying drawings, forming part of this specification, in which similar characters of reference indicate corresponding parts in all the figures.

Figure 1 is a section on the line $x\ x$ of Fig. 2 of an apparatus embodying my invention. Fig. 2 is a plan view thereof, and Fig. 3 is a section on the line $y\ y$ of Fig. 2.

Referring to the drawings, 1 designates a preliminary freezing-tank, from which chips or particles of ice floating on or in the water are discharged into a suction-pipe 2, leading to a slush-pump. The means provided for skimming off and discharging the ice particles or chips consists of a series of scoops 3, mounted to swing on endless carrier-chains 4 and 5. Each scoop consists of a suitable metal frame with the bottom, back, and sides of screen material, so that the said scoops will carry along the particles of ice, but will permit the water to flow through the scoops and back into the tank. The chain 4 extends around sprocket-wheels 6 and 7, while the chain 5 extends around sprocket-wheels 8 and 9. The sprocket-wheels 7 and 9 are mounted on a shaft 10, which has its bearings in boxes secured to the tank, while the shaft 11, on which the sprocket-wheels 6 and 8 are mounted, has bearings in adjustable boxes 12. These boxes 12 are made to move lengthwise of the tank and are adjustable by means of screws 13. The object in adjusting the said boxes is to give a proper tension to the carrier-chains.

The scoops 3 are sufficiently short to pass over the shafts 10 and 11 while the said scoops hang in a vertical position on the upper stretches of the carrier-chains, and on their backward movement, as indicated in Fig. 1, while passing through the water in the tank 1, the scoops are turned to a substantially horizontal position to gather up the ice particles, as here shown, by means of guide-tracks 14, extended lengthwise of the tank. These guide-rails are curved downward at the rear end and are curved upward at the forward or outlet end of the tank, the forward curve being somewhat less than the curve at the rear end, and between these curved portions the tracks have a slight upward inclination toward the outlet end. By this arrangement the scoops are gradually raised toward the surface of the water as they move toward the outlet end, thus permitting the water that may be scooped up to readily pass through the meshes of the scoops.

Arranged at the outlet end of the tank is a spring-actuated hammer or buffer 15, designed to be engaged by a scoop or by one of its trunnions when the said scoop is about to discharge its load. The trunnion of a scoop gradually compresses the spring of the hammer until the scoop is at the moment of discharge. Then when released the upper short portion of the hammer strikes the trunnion, causing the ice particles to quickly pass off the scoop and fall into the pipe 2. The shank 16 of the buffer or hammer extends through a bracket 17 and through a tube 18, extended outward from the bracket. A spring 19 is arranged between a collar on the stem 16 and the outer end of the tube, as clearly indicated in Fig. 1.

During the operation it is necessary to admit a certain amount of water to the pipe 2 to give the necessary mobility to the slush. This water is to be discharged from the tank 1, and the discharge through the outlet 20 may be regulated or governed by means of a gate-valve 21, upon which is a rack 22, engaging with a pinion 23 on a shaft 24, which extends out through one side of the tank and is provided with a crank-handle 25.

The scoops may be secured to the carrier-chains by any suitable means. I have here shown certain links of the chains as made in the form of plates 26, through which the trunnions of the scoops pass, and as these trunnions are headed on the outer side the scoops will be held from lateral movement.

While I have shown my invention as arranged to discharge the ice particles into a suction-pipe, it is possible that the ice particles may be delivered into cans, in which the ice is to be solidly frozen in a brine-pit.

It will be seen that when the scoops enter the rear end of the tank they will be gradually turned to a substantially horizontal position by the rear curved ends of the guide-rails, and as they move along said guide-rails they will scoop up and carry along particles of ice floating on and in the water, and upon reaching the discharge end the free ends of the scoops will be tipped slightly upward until they reach the ends of the tracks, when their open ends will be turned down and the trunnion will be struck by the buffer, with the result before mentioned. Boards are placed at the sides of the carrier to keep the ice in the path of the scoops.

Having thus described my invention, I claim as new and desire to secure by Letters Patent—

1. In an ice-machine, an apparatus for delivering ice particles from a freezing-tank, comprising an endless carrier movable through said tank, a series of scoops mounted to swing on said carrier, each scoop having a perforated bottom, and guide-rails extended through the tank, the said guide-rails being curved upward at the ends and serving to turn the scoops to substantially horizontal position, while moving through the tank, substantially as specified.

2. In an ice-machine, a device for delivering ice particles from the preliminary freezing-tank, comprising an endless carrier movable through the tank, scoops mounted to swing on said carrier, means in the tank for holding the scoops in substantially horizontal position while passing through the tank, and a buffer at the outlet end of the tank for imparting a jarring movement to the scoops, substantially as specified.

3. In an ice-machine, a device for skimming and delivering ice particles from a preliminary freezing-tank, comprising an endless carrier, scoops mounted to swing on said carrier, and guide-rails for the scoops extended through the tank, the said guide-rails being turned upward at the ends and portions of said rails between the turned-up ends being inclined upward toward the outlet end of the tank, substantially as specified.

4. A freezing-tank, having an outlet at one end, a valve for regulating said outlet, a rack on said valve, a pinion engaging with the rack, and a rod extended from the pinion to the outer side of the tank, an endless carrier movable through the tank, and scoops carried by said carrier, substantially as specified.

5. A preliminary freezing-tank, shafts mounted on said tank, one of said shafts being adjustable toward and from the other of said shafts, sprocket-wheels on the shafts, carrier-chains extending around the sprocket-wheels, perforated scoops mounted to swing on the carrier-chains, guide-rails extended through the tank for turning and holding said scoops in a substantially horizontal position while passing through the material in the tank, and means for imparting a shocking motion to a scoop while discharging, substantially as specified.

In testimony whereof I have signed my name to this specification in the presence of two subscribing witnesses.

AMBROSE HENRY RAUCH.

Witnesses:
WILLIAM J. FINK,
GEO. L. BAUM.